United States Patent
Yuri et al.

(10) Patent No.: US 8,049,350 B2
(45) Date of Patent: Nov. 1, 2011

(54) METHOD AND APPARATUS FOR CONTROLLING COGENERATION SYSTEM

(75) Inventors: Nobuyuki Yuri, Saitama (JP); Yojiro Sasaki, Saitama (JP); Kousuke Yamana, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 631 days.

(21) Appl. No.: 12/288,431

(22) Filed: Oct. 20, 2008

(65) Prior Publication Data

US 2009/0127868 A1 May 21, 2009

(30) Foreign Application Priority Data

Nov. 19, 2007 (JP) ................................. 2007-299413

(51) Int. Cl.
 *H02K 7/08* (2006.01)
(52) U.S. Cl. ........................ 290/40 R; 290/40 C; 290/41
(58) Field of Classification Search ................ 290/40 R, 290/41, 40 C
See application file for complete search history.

(56) References Cited

U.S. PATENT DOCUMENTS

| | | | |
|---|---|---|---|
| 7,663,256 B2 | 2/2010 | Yuri et al. | |
| 7,841,322 B2 | 11/2010 | Bach | |
| 7,885,756 B2 | 2/2011 | Livshiz et al. | |
| 7,886,712 B2 | 2/2011 | Hartmann et al. | |
| 7,891,192 B2 | 2/2011 | Myers et al. | |
| 7,969,030 B2 * | 6/2011 | Woods et al. | ................. 290/1 A |
| 2011/0030673 A1 | 2/2011 | Kanai | |
| 2011/0038396 A1 | 2/2011 | Yi et al. | |
| 2011/0041483 A1 | 2/2011 | Kapparos | |
| 2011/0054704 A1 | 3/2011 | Karpman et al. | |
| 2011/0061629 A1 | 3/2011 | Goes et al. | |
| 2011/0088674 A1 | 4/2011 | Shutty et al. | |
| 2011/0093182 A1 | 4/2011 | Weber et al. | |

FOREIGN PATENT DOCUMENTS

JP 08-004586 1/1996

* cited by examiner

*Primary Examiner* — Tulsidas C Patel
*Assistant Examiner* — Iraj A Mohandesi
(74) *Attorney, Agent, or Firm* — Carrier Blackman & Associates, P.C.; Joseph P. Carrier; William D. Blackman

(57) ABSTRACT

In an apparatus (and a method) for controlling a cogeneration system equipped with a generation unit having a generator connectable to an AC power feed line between a commercial power network and an electrical load and an internal combustion engine driving the generator, and a heat exchanger that exchanges heat between coolant and exhaust heat from the engine, there are provided with a condensate water hose discharging condensate water generated by condensation of moisture in exhaust gas, a hose temperature sensor detecting temperature in the hose, an exhaust gas temperature sensor detecting temperature of the exhaust gas from the engine and an exhaust gas blowout discriminator discriminating that the exhaust gas blows out through the hose when a difference between the hose temperature and the exhaust gas temperature is found to be less than a predetermined value. With this, exhaust gas leakage caused by blowout can be easily detected.

8 Claims, 4 Drawing Sheets

METHOD AND APPARATUS FOR CONTROLLING COGENERATION SYSTEM

BACKGROUND OF THE INVENTION

1. Field of the Invention

This invention relates to a method and apparatus for controlling a cogeneration system, particularly to a method and apparatus for controlling operation of a cogeneration system that detects exhaust gas leakage caused by blowout of an internal combustion engine.

2. Description of the Related Art

In recent years, cogeneration systems have been developed that are equipped with an internal combustion engine-driven generator for installation in an AC power supply line between a commercial power network and an electrical load for supplying power to a load in interconnection with the power network and also for supplying hot water or the like heated using exhaust heat from the engine to a thermal load. Such a cogeneration system is taught, for example, by Japanese Laid-Open Patent Application No. Hei 8-4586.

When such a cogeneration system is installed indoors, an exhaust system of the engine is connected to an exhaust duct and the exhaust gas is discharged to the exterior or outdoor therethrough, but sometimes the outlet of the exhaust duct is frozen or clogged by a bird's nest or the like. The exhaust system of the engine is also connected with a condensate water hose (tube) for discharging condensate water generated by condensation of moisture in the exhaust gas and when the exhaust duct outlet is clogged, the exhaust gas is blown out through the condensate water hose to be discharged to the exterior.

Although, in order to avoid the above disadvantageous event, an exhaust pressure switch is provided in the exhaust system to detect rise of exhaust pressure due to clogging, the exhaust pressure switch has a difficulty in detecting an abnormality of sensors and is easily affected by exhaust pulsation.

SUMMARY OF THE INVENTION

An object of this invention is therefore to overcome the foregoing disadvantage by providing a method and apparatus for controlling a cogeneration system that can detect exhaust gas leakage caused by blowout of an internal combustion engine without using an exhaust pressure switch.

In order to achieve the object, this invention provides at a first aspect an apparatus for controlling operation of a cogeneration system equipped at least with a generation unit having a generator connectable to an AC power feed line between a commercial power network and an electrical load and an internal combustion engine driving the generator, and a heat exchanger that exchanges heat with coolant of the engine with exhaust heat from the engine to warm up the coolant to be used for producing hot air or water for a thermal load, comprising: a condensate water hose installed in an exhaust system of the engine for discharging condensate water generated by condensation of moisture in exhaust gas; a hose temperature sensor installed in the condensate water hose for detecting temperature in the hose; an exhaust gas temperature sensor that detects temperature of the exhaust gas exhausted from the engine; and an exhaust gas blowout discriminator that discriminates that the exhaust gas blows out through the condensate water hose when a difference between the detected hose temperature and the detected exhaust gas temperature is found to be less than a predetermined value.

In order to achieve the object, this invention provides at a second aspect a method of controlling operation of a cogeneration system equipped at least with a generation unit having a generator connectable to an AC power feed line between a commercial power network and an electrical load and an internal combustion engine driving the generator, a heat exchanger that exchanges heat with coolant of the engine with exhaust heat from the engine to warm up the coolant to be used for producing hot air or water for a thermal load, and a condensate water hose installed in an exhaust system of the engine for discharging condensate water generated by condensation of moisture in exhaust gas, comprising the steps of: detecting temperature in the hose; detects temperature of the exhaust gas exhausted from the engine; and discriminating that the exhaust gas blows out through the condensate water hose when a difference between the detected hose temperature and the detected exhaust gas temperature is found to be less than a predetermined value.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A method and apparatus for controlling a cogeneration system according to embodiments of the invention will now be explained with reference to the attached drawings.

Figure 1:
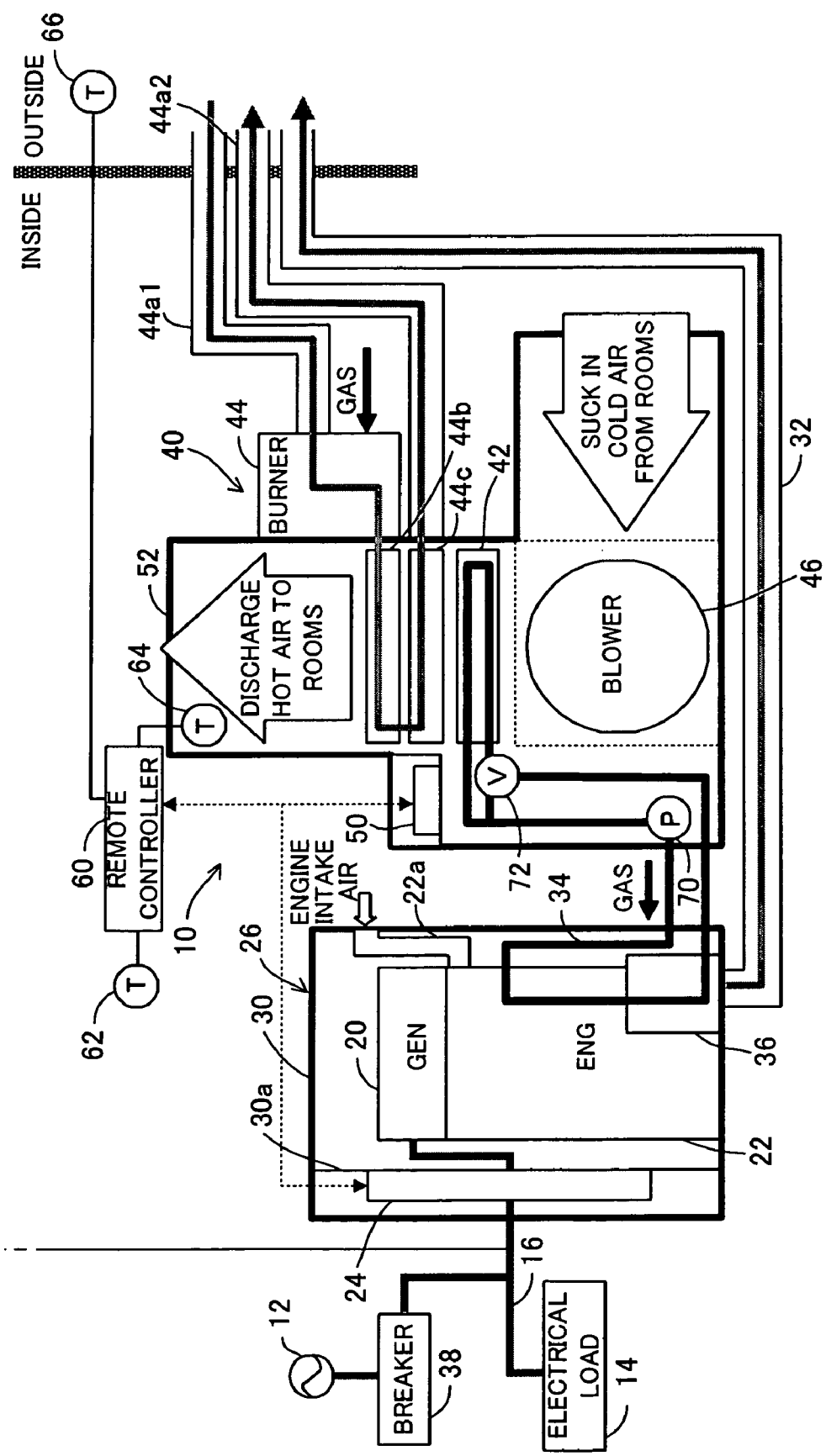
FIG. 1 is a block diagram giving an overall view of a method and apparatus for controlling a cogeneration system according to a first embodiment of this invention.

FIG. 1 is a block diagram giving an overall view of a method and apparatus for controlling a cogeneration system according to a first embodiment of this invention.

As illustrated, the cogeneration system (designated by reference numeral 10) is equipped with a power generation unit 26 having a generator (GEN) 20 constituted of multipolar coils and connectable to an AC power feed line (power line) 16 between a commercial power source (commercial power network) 12 and domestic electrical loads (electrical loads) 14, an internal combustion engine (ENG; hereinafter called "engine") 22 driving the generator 20 and a power controller 24. The cogeneration system 10 is installed indoors.

The power source 12 generates or outputs single-phase, three-wire, 100/200 V, 50 Hz (or 60 Hz) AC power. The generation unit 26 is integrally formed and housed in a generation unit case 30.

Specifically, as shown in FIG. 1, the generation unit case 30 is divided into two compartments by a partition 30a. The right compartment in the drawing accommodates the generator 20 and engine 22 to be arranged above and below in a vertical direction in the axis of gravity, and the left compartment accommodates the power controller 24. The power controller 24 is isolated from the engine 22, i.e., installed in one of the compartments which does not house the engine 22 so that heat from the engine 22 can be blocked as much as possible.

The engine 22 is a single-cylinder, four-cycle, water-cooled, spark-ignition, OHV engine that runs on the city gas or LP (liquefied petroleum) gas and has a displacement of, for example, 163 cc. Although not shown in the drawing, the cylinder head and cylinder block of the engine 22 is laid in the lateral (horizontal) direction in the generation unit case 30, and a piston is reciprocatingly accommodated therein.

Sucked air supplied from an air intake duct 22a is mixed with gas (indicated as GAS in FIG. 1) supplied from a gas supply source via a solenoid valve (not shown) by using a mixer. The air-fuel mixture thus produced flows into a combustion chamber and burns upon ignition by an ignition plug (not shown) to drive the piston, thereby rotating the crankshaft connected to the piston in a longitudinal (vertical) direction in the generation unit case 30. The generated exhaust gas passes through an exhaust pipe (not shown in FIG. 1) and an exhaust duct 32 connected to the generation unit case 30 and is discharged to the exterior of a room(s).

A coolant circulation passage 34 is formed to run through a heating region such as the cylinder block of the engine 22 and the coolant composed of antifreeze liquid circulates therethrough. The coolant exchanges heat with the heating region to rise its temperature, as cooling the engine 22, and passes through an exhaust-gas heat exchanger 36 installed along the exhaust pipe to be further heated.

A flywheel is attached to the upper end of the crankshaft and the inside thereof is installed with the generator 20. The generator 20 produces alternating current when rotating relatively to the flywheel. The output of the generator 20 is sent to the power controller 24.

Although not shown in the drawing, the power controller 24 comprises an electronic control unit (ECU) constituted as a microcomputer, an inverter and a DC/DC converter. The inverter inverts the DC output of the DC/DC converter to 100/200 V AC power (single phase).

The outside of the generation unit case 30 is installed with an operation panel (not shown) having a warning lamp and the like, and a main switch (not shown) that is disposed to be operable by the operator and, when turned off, stops the operation of the cogeneration system 10. The ECU of the power controller 24 controls the main switch to be turned off for stopping the operation of the cogeneration system 10 upon establishment of a specific condition.

The output of power generation of the generation unit 26 is 1.0 kW or thereabout. The output of the inverter is connected to the power feed line 16 via a breaker 38. When the generator 20 is supplied with power from the power source 12 via the inverter, it functions as a starter motor for cranking the engine 22. The ECU of the power controller 24 switches the function of the generator 20 between the starter and the generator, and controls the operation of the engine 22 and the like.

The cogeneration system 10 includes a hot-air heating unit 40 in addition to the generation unit 26.

The hot-air heating unit 40 comprises an exhaust heat exchanger 42 connected to the coolant circulation passage 34 of the engine 22, a burner 44, a sensible heat exchanger 44b and latent heat exchanger 44c connected to an intake pipe 44a1 and exhaust pipe 44a2 of combustion gas of the burner 44, a blower 46 that supplies intake air to the exhaust heat exchanger 42 and both the sensible heat exchanger 44b and latent heat exchanger 44c to exchange heat and supplies the generated hot air to the interior of the room(s) through a hot-air passage, and a hot-air heating unit controller 50.

The hot-air heating unit 40 is housed in a hot-air heating unit case 52 and connected to each room through the hot-air passage (not shown).

The foregoing configuration is explained separately. The generation unit 26 is connected to the hot-air heating unit 40 through the coolant circulation passage 34. Specifically, the coolant circulation passage 34 extends from the engine 22 toward the hot-air heating unit 40, is connected to the exhaust heat exchanger 42 positioned near the blower 46, and returns to the engine 22. In the exhaust heat exchanger 42, air flowing through the coolant circulation passage 34 is heat-exchanged with cold air of the rooms sucked in by the blower 46.

Cold air is warmed up by the heat exchange in the exhaust heat exchanger 42 to be hot air and supplied to each room by the blower 46 through an air duct (not shown) and the hot-air passage, thereby warming up the rooms.

The burner 44 sucks in air from the exterior or outside through the intake pipe 44a1 by using a combustion fan and mixes the sucked air with supply gas to burn. The generated combustion gas passes through the sensible heat exchanger 44b and latent heat exchanger 44c and is discharged from the exhaust pipe 44a2 to the exterior.

The sensible heat exchanger 44b and latent heat exchanger 44c warm up air passing through the air duct (not shown) of the blower 46 by the heat exchange. Specifically, the sensible heat exchanger 44b releases heat above the dew point of combustion gas and the latent heat exchanger 44c releases heat at or below the dew point. Condensate water generated in the latent heat exchanger 44c is discharged to the exterior through a drain pipe (not shown).

The blower 46 sucks in cold air from the rooms and supplies hot air which has been warmed up by the heat exchange by the exhaust heat exchanger 42 and further heated and warmed up by combustion by the burner 44, to the rooms through the air duct for warming the rooms.

The hot-air heating unit controller (hot-air controller) 50 is equipped with an ECU (electronic control unit) constituted as a microcomputer similarly to the ECU of the power controller 24. The ECU of the hot-air controller 50 is connected to the ECU of the power controller 24 to be able to communicate and also connected to a remote controller(s) (remote controllers installed in the respective rooms are collectively assigned by 60) to be able to communicate. The remote controller 60 is operated by the user to set a desired room temperature or the like.

In FIG. 1, "T" indicates temperature sensors 62 (sensors in the rooms are collectively assigned by 62), 64, 66, "P" indicates an exhaust-heat pump 70 and "V" indicates a valve 72 and they are electrically connected to the hot-air controller 50, although signal lines are partially omitted in the drawing.

The hot-air controller 50 drives the exhaust-heat pump 70 and valve 72 to pump the coolant flowing through the coolant circulation passage 34 to the exhaust heat exchanger 42 for exchanging heat between circulating water in the coolant circulation passage 34 and the cold air of the rooms sucked in by the blower 46.

In order to prevent corrosion due to accumulation of condensate water in the exhaust-gas heat exchanger 36 and taking the engine oil durability into account, the hot-air controller 50 controls such that the coolant temperature at the inlet of the engine 22 becomes, for example, 70° C.

The explanation will be made on the operation of the hot-air controller 50 and power controller 24 when the cogeneration system 10 is operated in interconnection with the power source 12. In the case of heating operation, the hot-air controller 50 compares an output of the temperature sensor 62 installed in the room with temperature set by the user through the remote controller 60, and sends a command to the power controller 24 to operate the generation unit 26 when the detected temperature is lower than the set temperature, while terminating the operation when the detected temperature has reached the set temperature. Subsequently, this procedure is repeated.

When the detected room temperature does not reach the set temperature after a lapse of a specified time period or when a difference between the detected temperature and set temperature exceeds a predetermined value, the hot-air controller 50 determines that the operation only by the generation unit 26 is insufficient and operates the burner 44 to burn for supplying hot air heated by the burner 44 to the rooms by the blower 46 until reaching the set temperature.

When electric power from the commercial power network (commercial power source) 12 is insufficient, the power controller 24 operates the generation unit 26 to supply power to the electrical load 14.

The explanation is made on the operation when the cogeneration system 10 is operated independently of the power source 12, i.e., in no interconnection with the power source 12, in the case, for example, where a commercial power network outage occurs. The power controller 24 activates the generation unit 26 simultaneously with occurrence of outage, and subsequently regulates the power output so as to keep constant voltage in response to increase/decrease of the electrical load.

When the generation unit 26 is operated, including a period during engine idling with no power output, the thermal output is generated. The hot-air controller 50 conducts the heating operation, burner operation and the like on thermal demand, similarly to the above-mentioned case of working together with the commercial power source 12.

Figure 2:
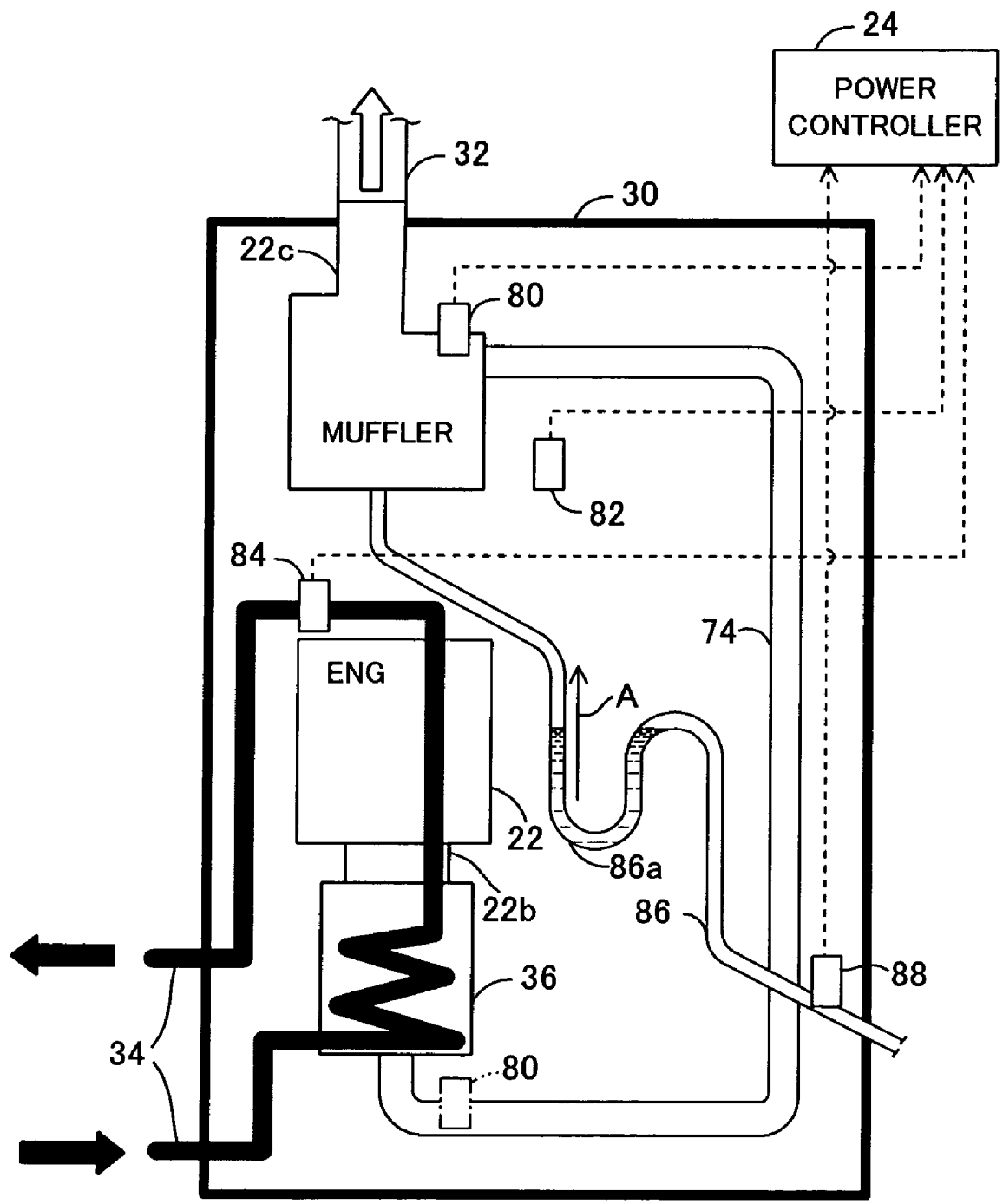
FIG. 2 is an explanatory view schematically showing connection between an internal combustion engine housed in a generation unit case and an exhaust-gas heat exchanger shown in FIG. 1.

FIG. 2 is an explanatory view schematically showing connection between the engine 22 housed in the generation unit case 30 and the exhaust-gas heat exchanger 36. In FIG. 2, the generator 20 is omitted for ease of illustration, and input/output directions of the coolant circulation passage 34 and a position of the exhaust duct 32 differ from those in FIG. 1. Specifically, FIG. 2 is not a view showing the actual allocation of the engine 22 etc. in a vertical direction but a diagram merely schematically showing the connection relationship.

As shown in FIG. 2, the exhaust-gas heat exchanger 36 is installed along the exhaust pipe 22b of the engine 22. The coolant circulation passage 34 runs through the heating region such as the cylinder block of the engine 22 and extends to the hot-air heating unit 40, such that the coolant flowing therethrough is warmed up by the heat exchange.

The exhaust-gas heat exchanger 36 is connected to a muffler 22c through a hose 74 to be airtight and the muffler 22c is connected to the exhaust duct 32 to be airtight. The exhaust gas from the engine 22 passes through the exhaust-gas heat exchanger 36 and hose 74 and, as being silenced by the muffler 22c, is discharged from the exhaust duct 32 to the exterior.

As shown in the drawing, an exhaust gas temperature sensor 80 is installed in the muffler 22c and produces an output or signal indicative of temperature Te of the exhaust gas (exhaust gas temperature) sent through the hose 74 that connects the exhaust-gas heat exchanger 36 with the muffler 22c. A case temperature sensor 82 is installed at an appropriate position in the generation unit case 30 to produce an output or signal indicative of temperature Ta in the case 30 (case temperature).

Also, a coolant temperature sensor 84 is installed in the coolant circulation passage 34 at a position adjacent to a heating region such as the cylinder block of the engine 22, and produces an output or signal indicative of coolant temperature Tw at the position.

As illustrated, a condensate water hose 86 is connected to the muffler 22c to discharge condensate water that is generated by condensation of moisture in the exhaust gas in the muffler 22c, to the exterior of the generation unit case 30. The condensate water hose 86 is equipped with a retainer (i.e., reservoir or trap) 86a of S-shape for retaining or trapping the condensate water as shown.

Although, as mentioned above, FIG. 2 is not a view showing the actual allocation of the engine 22 etc. in a vertical direction, as for the condensate water hose 86, when the vertical direction is as indicated by reference A in the drawing, the retainer 86a is configured to extend downward first and then upward in the vertical direction. Since a part of the condensate water from the muffler 22c does not flow out but remains at the retainer 86a, the exhaust gas does not blow out through the condensate water hose 86 so that it can avoid being leaked and discharged to the interior of the rooms.

The condensate water hose 86 is installed at a position downstream of the retainer 86a with a hose temperature sensor 88 that produces an output or signal indicative of temperature Tc in the condensate water hose 86 (hose temperature).

The outputs of the sensors 80, 82, 84, 86 are transmitted to the power controller 24 to be inputted to its ECU. Although the engine 22 is installed with a crank angle sensor and other sensors for detecting operating parameters and outputs of those sensors are also sent to the ECU of the power controller 24, illustration thereof is omitted.

Figure 3:
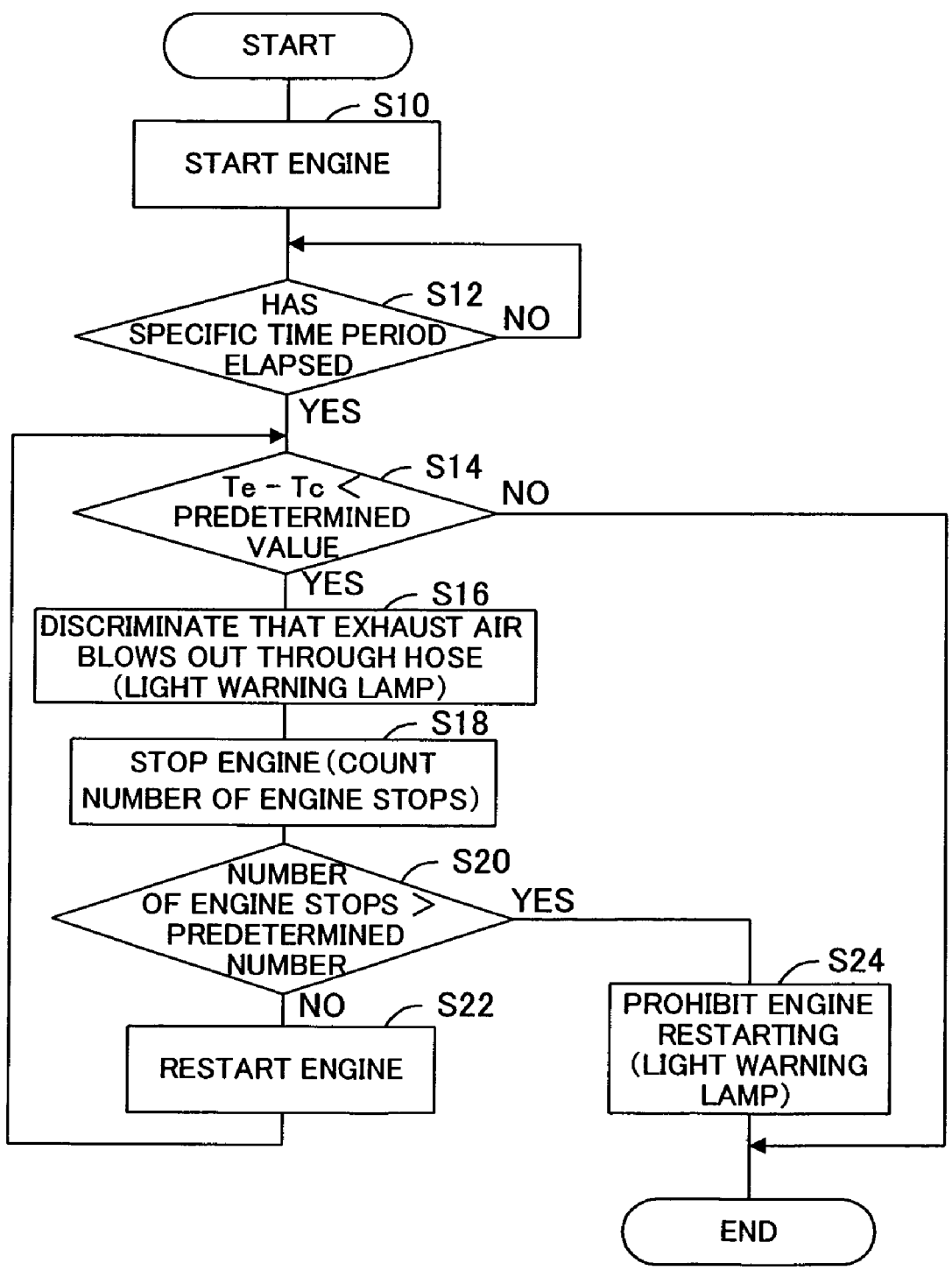
FIG. 3 is a flowchart showing the operation of the cogeneration system shown in FIG. 1, specifically the processing for detecting exhaust blowout executed by an ECU in a power controller.

FIG. 3 is a flowchart showing the processing for detecting exhaust blowout executed by the ECU in the power controller 24.

In S10, the engine 22 is started, specifically, the engine 22 is started to start the operation of the generation unit 26, and in S12, it is determined whether a specific time period, e.g., 10 minutes, or more has elapsed after the generation unit 26 is started, i.e., whether the operation of the generation unit 26 is thermally stabilized.

When the result in S12 is YES, i.e., it is discriminated that the specific time period has elapsed, the program proceeds to S14, in which a difference between the exhaust gas temperature Te detected by the exhaust gas temperature sensor 80 and the hose temperature Tc detected by the hose temperature sensor 88 is less than a predetermined value (e.g., 5° C.).

When the result in S14 is NO, the remaining steps are skipped and when the result is YES, the program proceeds to S16, in which it is discriminated that the exhaust gas blows out through the condensate water hose 86. As shown in FIG. 1, since the outlet of the exhaust duct 32 is positioned outdoors, it might be frozen in winter or clogged by a bird's nest, by child's mischief, or the like.

When the exhaust system is clogged, the exhaust gas flows through the condensate water hose 86, thereby raising the hose temperature Tc to a value near the exhaust gas temperature Te. Therefore, determining whether the difference between the exhaust gas temperature Te and hose temperature Tc is less than the predetermined value amounts to checking as to whether the hose temperature Tc became a value near the exhaust gas temperature Te, in other words, the exhaust gas blows out through the condensate water hose 86.

Then, in S18, the engine 22 is stopped and a number of engine stop is counted, and in S20, it is determined whether the counted number of engine stop exceeds a predetermined number. When the result is NO, the program proceeds to S22, in which the engine 22 is restarted, and the program returns to S14 to repeat the foregoing processing. When the result in S20 is YES, the program proceeds to S24, in which restarting of the engine 22 is prohibited and the warning lamp is lit.

Specifically, since the determination of S14 could be affirmative for a temporary reason, the processing from the engine start to temperature determination is repeated three times for reliably detecting exhaust gas leakage caused by blowout.

As stated in the foregoing, in an apparatus (and a method) for controlling operation of the cogeneration system 10 according to the first embodiment, it is discriminated that the exhaust gas blows out through the condensate water hose 86 when a difference between the detected hose temperature Tc and the detected exhaust gas temperature Te is found to be less than a predetermined value (5° C.) (S10 to S16). With this, exhaust gas leakage caused by blowout can be easily detected without using an exhaust pressure switch.

Further, since, when the above condition is detected, it means that the outlet of the exhaust duct 32 is frozen or clogged by a bird's nest or the like, it becomes possible to inform the user by lighting the warning lamp or the like to urge to remove the cause of the trouble, thereby resolving the clogging.

In the apparatus, the exhaust gas blowout discriminator stops the engine 22 each time it is discriminated that the exhaust gas blows out through the condensate water hose 86 and prohibits restarting of the engine 22 when a number of engine stops exceeds a predetermined number (three times) (S20 to S24). With this, in addition to the foregoing effects, a false detection made for a temporary reason can be avoided and it becomes possible to reliably detect and prevent exhaust gas leakage caused by blowout.

In the apparatus, the condensate water hose 86 includes the retainer 86a in its midstream for retaining condensate water. With this, in addition to the effects mentioned in the first embodiment, since the condensate water is surely retained in the retainer 86a of the condensate water hose 86, exhaust gas leakage caused by blowout can be reliably prevented.

Figure 4:
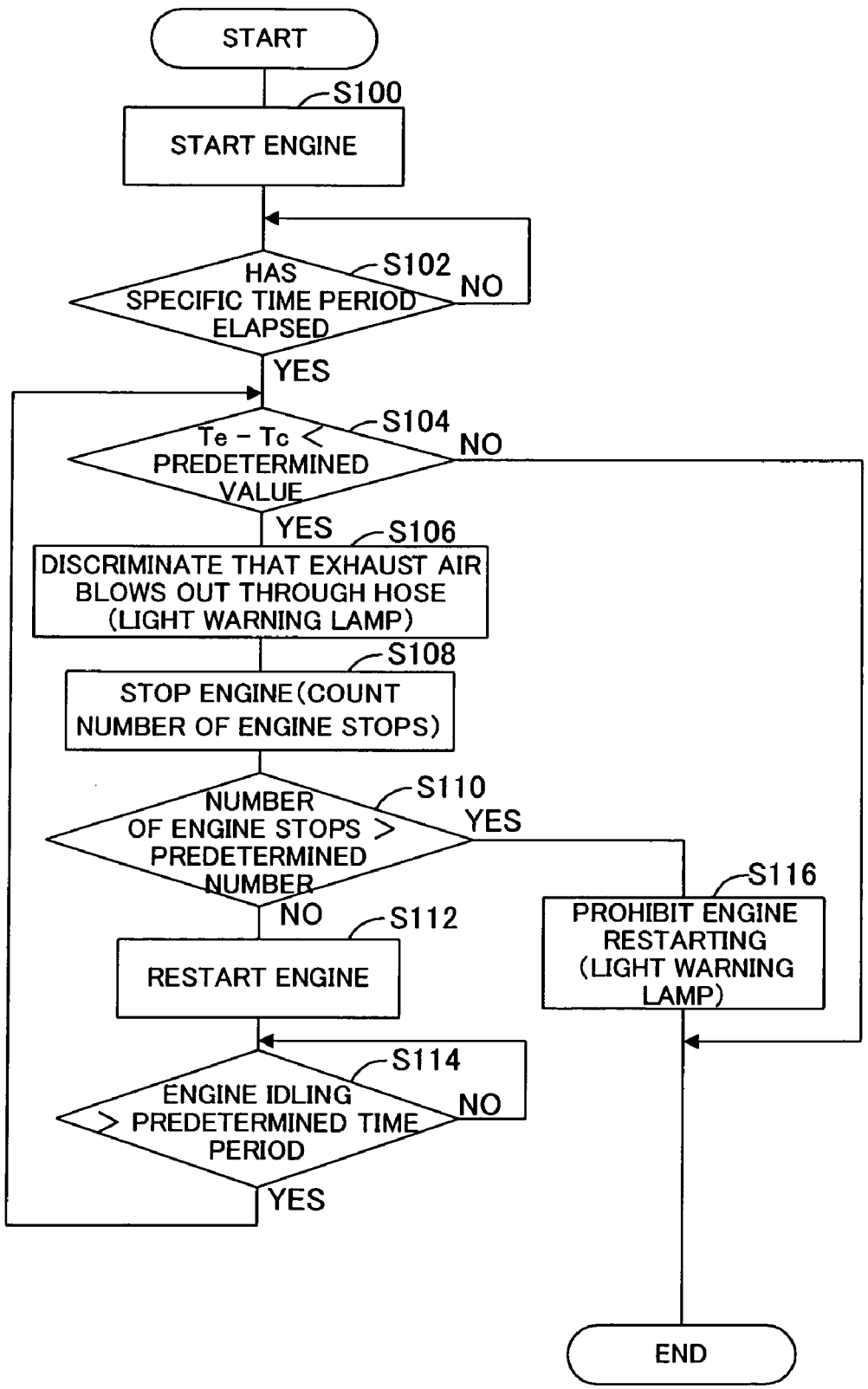
FIG. 4 is a flowchart showing the operation of a cogeneration system according to a second embodiment, specifically the processing for detecting exhaust blowout executed by the ECU in the power controller.

FIG. 4 is a flowchart similar to FIG. 3 but showing the operation of a cogeneration system according to a second embodiment, specifically the processing for detecting exhaust blowout executed by the ECU in the power controller 24.

Following the processing of S110 to S112 similar to that of S10 to S22 of the flowchart of FIG. 3, in S114, after restarting the engine 22, it is determined whether engine idling is continued for a predetermined time period (e.g., 5 minutes), i.e., the engine 22 is controlled to run at a prescribed low (idling) engine speed under low load for the predetermined time period. Only when the result is YES, the program returns to S104 to repeat the foregoing processing. The remaining configuration including the processing of S116 is the same as that in the first embodiment.

Specifically, although it is configured to avoid exhaust gas leakage through the condensate water hose 86 by retaining or trapping the condensate water in the retainer 86a, if the exhaust gas blows out through the condensate water hose 86 once, all the condensate water including water to be retained is discharged, so the exhaust gas leakage cannot be prevented.

Therefore, the engine 22 should be restarted to generate the condensate water, but in the case of high electrical load, the condensate water increases too much to be retained in the retainer 86a. In the second embodiment, since the low-load operation at or below the prescribed low engine speed (i.e., idling) is continued for the predetermined time period (5 minutes), the condensate water can be reliably retained in the retainer 86a, thereby preventing exhaust gas leakage through the condensate water hose 86.

As stated in the foregoing, in an apparatus (and a method) for controlling the cogeneration system 10 according to the second embodiment, the exhaust gas blowout discriminator stops the engine 22 once (S108) and restarts the engine 22 such that it runs at a prescribed low engine speed for a predetermined time period (S112 to S114) when it is discriminated that the exhaust gas blows out through the condensate water hose 86 (S106). With this, in addition to the foregoing effects, since the condensate water is surely retained in the retainer 86a of the condensate water hose 86, exhaust gas leakage caused by blowout can be more reliably prevented after restarting the engine 22.

As mentioned in the first and second embodiments, it is configured to have an apparatus (and a method) for controlling operation of a cogeneration system (10) equipped at least with a generation unit (26) having a generator (20) connectable to an AC power feed line (16) between a commercial power network (12) and an electrical load (14) and an internal combustion engine (22) driving the generator, and a heat exchanger (exhaust-gas heat exchanger 36) that exchanges heat with coolant of the engine with exhaust heat from the engine to warm up the coolant to be used for producing hot air or water for a thermal load, comprising: a condensate water hose (86) installed in an exhaust system of the engine for discharging condensate water generated by condensation of moisture in exhaust gas; a hose temperature sensor (88) installed in the condensate water hose for detecting temperature Tc in the hose; an exhaust gas temperature sensor (80) that detects temperature Te of the exhaust-gas exhausted from the engine; and an exhaust gas blowout, discriminator that discriminates that the exhaust gas blows out through the condensate water hose when a difference between the detected hose temperature Tc and the detected exhaust gas temperature Te is found to be less than a predetermined value (ECU of the power controller 24, S10 to S16, S100 to S106).

Further in the apparatus, the condensate water hose includes a retainer (86a) in its midstream for retaining condensate water.

Further in the apparatus, the exhaust gas blowout discriminator stops the engine once and restarts the engine such that it runs at a prescribed low engine speed for a predetermined time period when it is discriminated that the exhaust gas blows out through the condensate water hose (ECU of the power controller 24, S108 to S114).

Further in the apparatus, the exhaust gas blowout discriminator stops the engine each time it is discriminated that the exhaust gas blows out through the condensate water hose and prohibits restarting of the engine when a number of engine stops exceeds a predetermined number (three times) (ECU of the power controller 24, S18 to S24, S108 to S116).

It should be noted that although the exhaust gas temperature sensor 80 is installed in the muffler 22c, it can be installed in the hose 74 in the vicinity of a region immediately beneath the exhaust-gas heat exchanger 36 as indicated by an imaginary line in FIG. 2, or at any position downstream thereof and before the muffler 22c.

It should also be noted that the foregoing predetermined value and other values vary in accordance with specification or configuration, such as power generation capacity, of the cogeneration system 10.

It should also be noted that, instead of a gas engine using gas fuel such as the city gas or LP (liquefied petroleum) gas exemplified as the power source of the generator 20, it can be an engine using gasoline fuel or the like. Further, although the output of the generator 20, displacement of the engine 22 and the like are shown by specific values, they are only examples and not limited thereto.

Japanese Patent Application No. 2007-299413 filed on Nov. 19, 2007, is incorporated herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling operation of a cogeneration system equipped at least with a generation unit having a generator connectable to an AC power feed line between a commercial power network and an electrical load and an internal combustion engine driving the generator, and a heat exchanger that exchanges heat with coolant of the engine with exhaust heat from the engine to warm up the coolant to be used for producing hot air or water for a thermal load, comprising:
   a condensate water hose installed in an exhaust system of the engine for discharging condensate water generated by condensation of moisture in exhaust gas;
   a hose temperature sensor installed in the condensate water hose for detecting temperature in the hose;
   an exhaust gas temperature sensor that detects temperature of the exhaust gas exhausted from the engine; and
   an exhaust gas blowout discriminator that discriminates that the exhaust gas blows out through the condensate water hose when a difference between the detected hose temperature and the detected exhaust gas temperature is found to be less than a predetermined value.

2. The apparatus according to claim 1, wherein the condensate water hose includes a retainer in its midstream for retaining condensate water.

3. The apparatus according to claim 2, wherein the exhaust gas blowout discriminator stops the engine once and restarts the engine such that it runs at a prescribed low engine speed for a predetermined time period when it is discriminated that the exhaust gas blows out through the condensate water hose.

4. The apparatus according to claim 1, wherein the exhaust gas blowout discriminator stops the engine each time it is discriminated that the exhaust gas blows out through the condensate water hose and prohibits restarting of the engine when a number of engine stops exceeds a predetermined number.

5. A method of controlling operation of a cogeneration system equipped at least with a generation unit having a generator connectable to an AC power feed line between a commercial power network and an electrical load and an internal combustion engine driving the generator, a heat exchanger that exchanges heat with coolant of the engine with exhaust heat from the engine to warm up the coolant to be used for producing hot air or water for a thermal load, and a condensate water hose installed in an exhaust system of the engine for discharging condensate water generated by condensation of moisture in exhaust gas, comprising the steps of:
   detecting temperature in the hose;
   detects temperature of the exhaust gas exhausted from the engine; and
   discriminating that the exhaust gas blows out through the condensate water hose when a difference between the detected hose temperature and the detected exhaust gas temperature is found to be less than a predetermined value.

6. The method according to claim 5, wherein the condensate water hose includes a retainer in its midstream for retaining condensate water.

7. The method according to claim 6, wherein the step of exhaust gas blowout discrimination stops the engine once and restarts the engine such that it runs at a prescribed low engine speed for a predetermined time period when it is discriminated that the exhaust gas blows out through the condensate water hose.

8. The method according to claim 5, wherein the step of exhaust gas blowout discrimination stops the engine each time it is discriminated that the exhaust gas blows out through the condensate water hose and prohibits restarting of the engine when a number of engine stops exceeds a predetermined number.

* * * * *